(12) United States Patent
Kim et al.

(10) Patent No.: US 9,285,528 B2
(45) Date of Patent: Mar. 15, 2016

(54) LIGHTING DEVICE

(75) Inventors: Seog Joon Kim, Cheonan-si (KR); Mee Suk Rho, Seongnam-si (KR); Taek Kyu Kim, Seongnam-si (KR); Kazuhiro Kashiwagi, Hamamatsu (JP); Isao Koike, Hamamatsu (JP); Kunitoshi Shimizu, Hamamatsu (JP); Akira Ikemoto, Hamamatsu (JP)

(73) Assignees: NextEye Co., Ltd., Kyunggi-do (KR); Kowa Company, Ltd., Nagoya-shi Aichi (JP)

( * ) Notice: Subject to any disclaimer, the term of this patent is extended or adjusted under 35 U.S.C. 154(b) by 129 days.

(21) Appl. No.: 14/002,102

(22) PCT Filed: Feb. 28, 2012

(86) PCT No.: PCT/KR2012/001484
§ 371 (c)(1),
(2), (4) Date: Aug. 28, 2013

(87) PCT Pub. No.: WO2012/118316
PCT Pub. Date: Sep. 7, 2012

(65) Prior Publication Data
US 2014/0022821 A1    Jan. 23, 2014

(30) Foreign Application Priority Data

Mar. 1, 2011  (JP) .................................. 2011-043670
Apr. 11, 2011  (KR) ........................ 10-2011-0033204

(51) Int. Cl.
*F21V 8/00*     (2006.01)
*F21V 15/01*    (2006.01)
(Continued)

(52) U.S. Cl.
CPC ............ *F21V 19/004* (2013.01); *G02B 6/0091* (2013.01); *F21Y 2101/02* (2013.01); *F21Y*
*G02B 6/0011* (2013.01); *F21V 15/01* (2013.01); *F21V 19/003* (2013.01);
(Continued)

(58) Field of Classification Search
CPC ...... F21V 15/01; F21V 19/004; G02B 6/0091
See application file for complete search history.

(56) References Cited

U.S. PATENT DOCUMENTS

2009/0097277 A1*   4/2009   Iwasaki ......................... 362/628
2010/0188599 A1*   7/2010   Arihara ........................... 349/60

FOREIGN PATENT DOCUMENTS

KR    2001 0001119    1/2001
KR    2003 0020061    3/2003
(Continued)

OTHER PUBLICATIONS

International Search Report, mailing date Oct. 23, 2012, for corresponding International Application No. PCT/KR2012/001484 with English translation.

*Primary Examiner* — Elmito Breval
(74) *Attorney, Agent, or Firm* — Intellectual Property Law Group LLP

(57) ABSTRACT

Disclosed herein is an edge-type lighting device which is configured such that when a light guide plate thermally expands, a light source is prevented from being pressed. In the lighting device according to the present invention, a light guide plate (2) is slidably supported so that the light guide plate (2) can expand in the planar direction, and a light source (3) disposed on an edge of the light guide plate (2) is movably supported in the same direction. A light-guide-plate stopper (4b) is disposed at a position facing an edge (2A) of the light guide plate (2) to prevent the light guide plate (2) from expanding excessively. Thus, the light source (3) can be prevented from being pressed toward a frame member (4).

12 Claims, 4 Drawing Sheets

(51) Int. Cl.
*F21V 19/00* (2006.01)
*F21Y 103/00* (2006.01)
*F21Y 105/00* (2006.01)
*F21Y 101/02* (2006.01)

(52) U.S. Cl.
CPC ............ 2103/003 (2013.01); *F21Y 2105/00* (2013.01); *G02B 6/0085* (2013.01)

(56) References Cited

FOREIGN PATENT DOCUMENTS

| | | |
|---|---|---|
| KR | 2010 0061326 | 6/2010 |
| KR | 2010 0124320 | 11/2010 |

\* cited by examiner

LIGHTING DEVICE

CROSS-REFERENCE TO RELATED APPLICATIONS

This application is a U.S. National Phase application, under 35 U.S.C. §371, of International Application no. PCT/KR2012/001484, with an international filing date of Feb. 28, 2012, and claims benefit of Japan Application no. 2011-043670 filed on Mar. 1, 2011 and of Korean Application no. 10-2011-0033204 filed on Apr. 11, 2011, and which are hereby incorporated by reference for all purposes.

TECHNICAL FIELD

The present invention relates, in general, to a lighting device and, more particularly, to an edge-type lighting device which is configured such that, when a light guide plate thermally expands, a light source can be prevented from being pressed.

BACKGROUND ART

Different kinds of edge-type lighting devices where light sources are disposed on edges of light guide plates have been proposed (for example, refer to Patent document 1).

FIG. 11 is a sectional view illustrating an embodiment of a conventional structure of an edge-type lighting device. In the drawing, reference numeral 202 denotes a light guide plate made of a transparent material, and reference numeral 203 denotes light sources which are disposed facing each other on respective edges of the light guide plate 202 and emit light L1 into the light guide plate 202. The lighting device is configured such that light L1 that is emitted from the light sources 203 and enters the light guide plate 202 is emitted from a front surface of the light guide plate 202 (see reference numeral L2). In the edge-type lighting device having the above-mentioned construction, the light sources 203 can be disposed on the edges of the light guide plate 202 rather than on a rear surface of the light guide plate 202. Therefore, the edge-type lighting device can be markedly reduced in thickness. Such an edge-type lighting device is mounted to a ceiling, a sidewall, etc. of a room or the like.

SUMMARY OF THE INVENTION

Technical Problem

However, in the conventional lighting device, when the light guide plate 202 is expanded by heat generated from the LED light sources 203, there is a possibility of the LED light sources 203 being pressed between the light guide plate 202 and the frame member 204. Although edge-type lighting devices are used as backlight units for liquid crystal (LC) TVs or LC monitors, when edge-type lighting devices are used as original lighting devices rather than as backlight units, a lot of attention should be given to the potential expansion of the light guide plate 202, because the quantity of light emitted from the LED light sources 203 is increased and thus the heat generation rate is also increased.

Accordingly, the present invention has been made keeping in mind the above problems occurring in the prior art, and an object of the present invention is to provide an edge-type lighting device which is configured such that, when a light guide plate thermally expands, a light source can be prevented from being pressed.

Technical Solution

In order to accomplish the above object, the present invention provides a lighting device, comprising: a light guide plate made of a transparent material and having a rectangular shape when viewed from a front view; a light source disposed facing at least one of edges of the light guide plate; and a frame member receiving at least a portion of the light guide plate and at least a portion of the light source, the lighting device being configured such that light that is emitted from the light source and enters the light guide plate is emitted from a front surface of the light guide plate, wherein when, among the edges of the light guide plate, an edge that faces the light source is referred to as a [light-source facing edge], the frame member include: a light-guide-plate support part supporting the light guide plate so that the light guide plate can slide in at least a normal line direction of the light-source facing edge; a first space receiving both an edge portion of the light guide plate that includes the light-source facing edge and the light source disposed facing the light-source facing edge in such a way that the edge portion and the light source can move in the normal line direction; a light-guide-plate stopper disposed facing a portion of the light-source facing edge that is adjacent to a corner of the light guide plate, the light-guide-plate stopper limiting sliding movement of the light guide plate; and a second space formed at a side of the light-guide-plate stopper that is opposite to a side at which the light guide plate comes into contact with the light-guide-plate stopper, the second space communicating with the first space, and when a portion of the light-guide-plate stopper that is brought into contact with the light-source facing edge when the light-guide-plate stopper limits sliding movement of the light guide plate is referred to as a [stopper side contact portion], and a direction away from the light guide plate based on the stopper side contact portion is referred to as a [light-guide-plate moving away direction], the first space is formed to receive the light source in such a way that the light source is movable in the light-guide-plate moving away direction rather than towards the stopper side contact portion.

The first space may extend a predetermined distance along the light-source facing edge from a position adjacent to the corner of the light guide plate in a direction away from the corner.

Furthermore, an electric wire may be connected to the light source and arranged from the first space through the second space.

The frame member may have therein a third space communicating with the second space and extending along the rear surface of the light guide plate, and the electric wire may be arranged from the second space through the third space.

The light source may comprise an LED light source.

In addition, a spring may be provided in the first space and disposed at a side opposite to a surface of the light source that faces the light guide plate, the spring pushing the light source towards the light-source facing edge.

The light-guide-plate stopper may be disposed at a position capable of preventing the spring from being deformed to a predetermined degree or more.

Advantageous Effects

According to the present invention, a light guide plate is supported by a light-guide-plate support part so as to be slidable in a normal line direction (that is, in the normal line direction of a light-source facing edge of the light guide plate). Therefore, thermal expansion of the light guide plate that is accompanied by heat generated from a light source is allowed.

Furthermore, in the lighting device of the present invention, the light source which is disposed on an edge of the light guide plate is provided so as to be movable in the normal line direction rather than being fixed to the frame member. In addition, the light-guide-plate stopper restricts the light guide plate from sliding to a predetermined degree or more. Therefore, even if the light guide plate is expanded in the normal direction by heat generated by the light source, the light source can be prevented from being pressed between the light guide plate and the frame member (an inner side surface of the frame member).

In addition, the lighting device according to the present invention is configured such that a first space communicates with a second space, wherein these spaces can be used as space for arrangement of an electric wire for the light source. Therefore, it is not required to arrange the electric wire between the light-source facing edge (in detail, a surface of a portion of the light-source facing edge adjacent to the corner of the light guide plate) and the light-guide-plate stopper so that the electric wire can be prevented from being caught between the light guide plate and the light-guide-plate stopper.

In the lighting device of the present invention, because the electric wire is covered with a frame member, the external appearance of the lighting device can be enhanced.

Moreover, the lighting device of the present invention is configured in such a way that the light source makes close contact with the light-source facing edge, whereby light emitted from the light source can be efficiently guided into the light guide plate, thus improving the light emitting efficiency of the lighting device.

In the lighting device of the present invention, the spring can be prevented from being overloaded.

DETAILED DESCRIPTION OF SPECIFIC EMBODIMENTS

Figure 1:
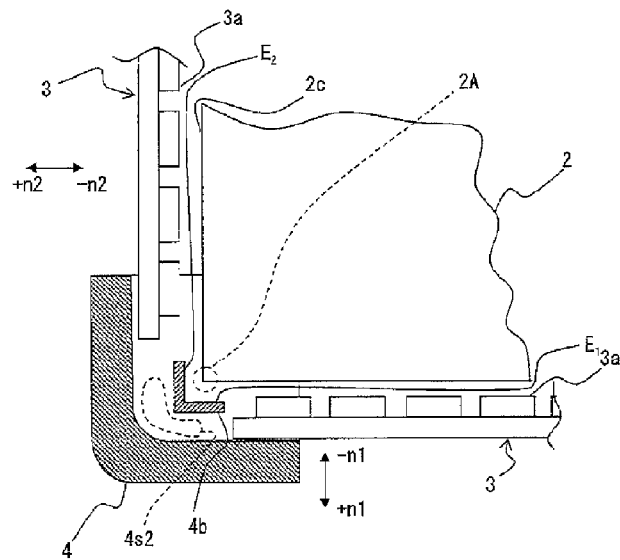
FIG. 1 is a plan view illustrating in detail the shape of a light-guide-plate stopper, according to the present invention.

Hereinafter, a preferred embodiment of the present invention will be described in detail with reference to FIGS. 1 through 10.

As illustrated by reference numeral 1 of FIGS. 3 and 4, a lighting device according to the present invention includes: a planar member (in this specification, referred to as a "light guide plate") which is made of a transparent material such as acryl or polycarbonate; a light source 3 which is disposed facing at least one edge (see reference numeral 2c of FIG. 5) of edges of the light guide plate 2; and a frame member 4 which receives therein both at least a portion of the light guide plate 2 and at least a portion of the light source 3. The lighting device is configured such that light L1 that is emitted from the light source 3 and enters the light guide plate 2 is emitted from a front surface (see reference numeral 2a of FIG. 5) of the light guide plate 2 (see reference numeral L2 of FIG. 4). Furthermore, in this specification, with regard to the light guide plate 2, the surface (see reference numeral 2a of FIG. 5) from which light is emitted is referred to as a "front surface". A surface 2b that is opposite to the front surface is referred to as a "rear surface". Surfaces 2c that are approximately perpendicular to the front and rear surfaces are referred to as "edges". Among the edges of the light guide plate 2, the edge that faces the light source 3 (the entirety of the edge that faces the light source 3 rather than only a portion of the edge) is referred to as a "light-source facing edge". In addition, with regard to the LED light source 3, a surface from which light is emitted is referred to as a "front surface" (see reference numeral 3a of FIG. 5), a surface 3b that is opposite to the front surface is referred to as a "rear surface", and surfaces 3c and 3d that are approximately perpendicular to the front and rear surfaces 3a and 3b are referred to as "side surfaces".

Figure 5:
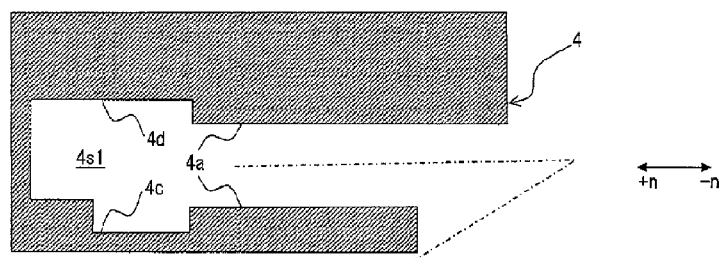
FIG. 5 is an exploded sectional view illustrating a structure for supporting a light source, according to the present invention.
Figure 5:
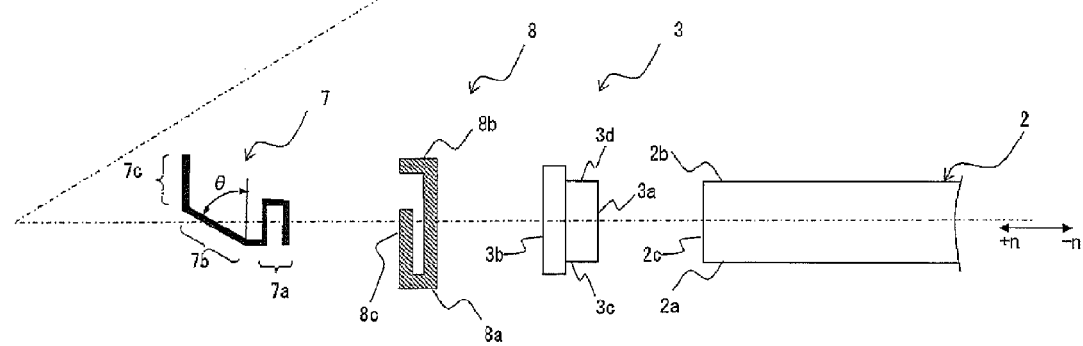
Figure 6:
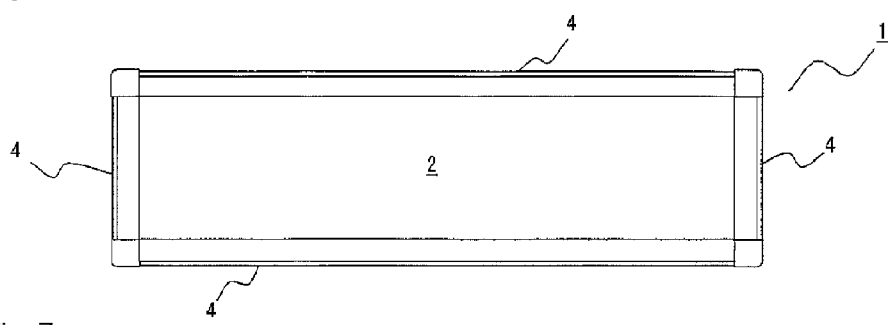
FIG. 6 is a front view illustrating an embodiment of the construction of a lighting device, according to the present invention.
Figure 7:
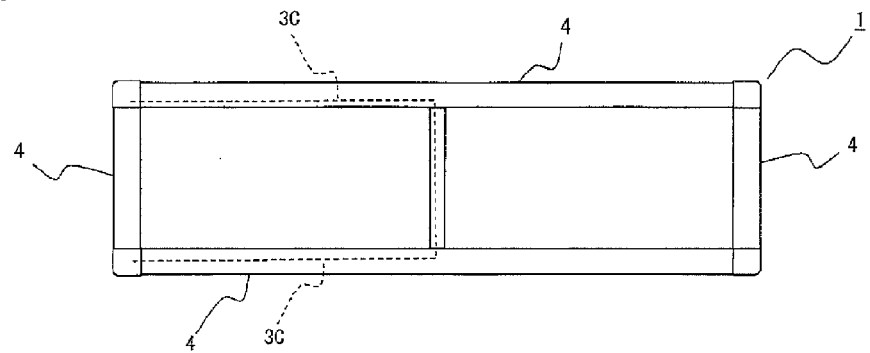
FIG. 7 is a rear view of the lighting device.
Figure 8:
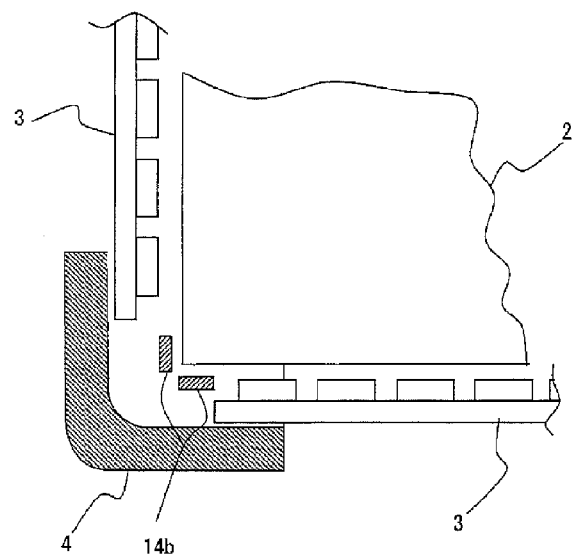
FIG. 8 is a plan view illustrating in detail another embodiment of the shape of a light-guide-plate stopper, according to the present invention.

As shown in FIGS. 6 and 7, the front surface and the rear surface of the light guide plate 2 are approximately rectangular. The frame member includes: light-guide-plate support parts (see reference numeral 4a and 4b of FIG. 5) which support the light guide plate 2 so that the light guide plate 2 can slide in at least a normal line direction (see reference character ±n of FIGS. 4 and 5) of the light-source facing edge 2c; a first space (see reference numeral 4s2 of FIGS. 4 and 5) which receives both an edge portion of the light guide plate 2 that includes the light-source facing edge 2c and the light source 3 disposed facing the light-source facing edge 2c in such a way that the edge portion and the light source 3 can move in the normal line direction (±n); a light-guide-plate stopper 4b which is, as shown in FIGS. 1 and 2, disposed facing an edge of at least one corner 2A of the light guide plate 2 (in detail, a portion of the light-source facing edge 2c that is adjacent to the corner of the light guide plate 2) and limits sliding movement of the light guide plate 2; and a second space (see reference numeral 4s1 of FIG. 1) which communicates with the first space 4s1 and is formed at a side of the light-guide-plate stopper 4b that is opposite to a side, at which the light guide plate 2 comes into contact with the light-guide-plate stopper 4b.

Furthermore, in the case where portions (see reference characters E1 and E2 of FIGS. 1 and 2) of the light-guide-plate stopper 4b, with which the light-source facing edge 2c makes contact when the light-guide-plate stopper 4b limits the sliding movement of the light guide plate 2, are referred to as "stopper side contact portions", and directions away from the light guide plate 2 based on the stopper side contact portions E1 and E2 (a direction of +n1 with regard to the stopper side contact portion E1 and a direction of +n2 with regard to the stopper side contact portion E2) are referred to as "light-guide-plate moving away directions", the first space 4s1 is formed to receive the light source 3 in such a way that the light source 3 is movable in the light-guide-plate moving away direction (+n1) or (+n2) rather than towards the stopper side contact portion E1 or E2.

Figure 2:
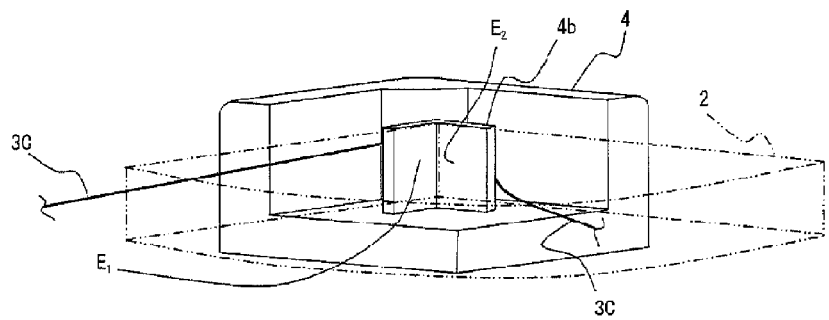
FIG. 2 is a perspective view of the light-guide-plate stopper.

Furthermore, as shown in FIGS. 1 and 2, although each stopper side contact portion E1, E2 is illustrated as being planar, the present invention is not limited to this. For example, each stopper side contact portion E1, E2 may have other shapes (e.g. a curved shape, a protrusion shape, etc.). In this case, a well known diffusion plate (not shown) made of acryl or polycarbonate is disposed adjacent to a front surface of the light guide plate 2, and a well known reflection plate (not shown) is disposed adjacent to a rear surface of the light guide plate 2.

According to the present invention, the light guide plate 2 is supported by the light-guide-plate support parts 4a and 4b so as to be slidable in the normal direction (±n) (in other words, in the normal direction (±n) of the light-source facing edge 2c). Therefore, thermal expansion of the light guide plate 2 which is accompanied by heat generated by the light source 3 is allowed.

Furthermore, the light source 3 which is disposed on an edge of the light guide plate 2 is provided so as to be movable in the normal line direction (±n) rather than being fixed to the frame member 4. In addition, the light-guide-plate stopper 4b restricts the light guide plate 2 from sliding to a predetermined degree or more. Therefore, even if the light guide plate 2 is expanded in the normal direction (±n) by heat generated by the light source 3, the light source 3 can be prevented from being pressed between the light guide plate 2 and the frame member 4 (an inner side surface of the frame member 4). Furthermore, because the light guide plate 2 is supported so as to be slidable, when the lighting device 1 is installed, a problem of the possibility of the light guide plate 2 having made contact with some of the light-guide-plate stoppers 4b (for example, two of the four light-guide-plate stoppers 4b that are respectively disposed at the four corners of the light guide plate 2) can be avoided. In this case, because the remaining light-guide-plate stoppers 4b (that is, the light-guide-plate stoppers 4b that do not make contact with the light guide plate 2) are spaced apart from the light guide plate 2, when the light guide plate 2 thermally expands, the light guide plate 2 is moved in such a way while the light guide plate 2 is making contact with some of the light-guide-plate stoppers 4b (in other words, the light-guide-plate stoppers 4b that have made contact with the light guide plate 2), the distance between the light guide plate 2 and the other light-guide-plate stoppers 4b (that still do not make contact with the light guide plate 2) is reduced.

Moreover, the present invention is configured such that the first space 4s1 communicates with the second space 4s2. These spaces 4s1 and 4s2 can be used as space for arrangement of an electric wire of the light source 3. Therefore, it is not required to arrange the electric wire between the light-source facing edge 2c (in detail, a surface of a portion of the light-source facing edge 2c adjacent to the corner of the light guide plate 2) and the light-guide-plate stopper 4b so that the electric wire can be prevented from being caught between the light guide plate 2 and the light-guide-plate stopper 4b.

Meanwhile, it is not necessary for the light source 3 to be disposed facing every edge 2c of the light guide plate 2. For instance, if the light guide plate 2 is rectangular and has four edges, the light source 3 may be disposed facing only one of the four edges. Alternatively, the light source 3 may be disposed facing each of two edges of the four edges. As a further alternative, the light source 3 may be disposed facing each of three or four edges of the four edges. Further, with regard to the edge of the light guide plate 2 (the light-source facing edge 2c facing the light source 3), it is not required for the light source 3 to cover the entire length of the light-source facing edge 2c (in other words, the length from one corner 2A to the adjacent corner 2A of the light guide plate 2). That is, the light source 3 may be configured to cover only a portion of the light-source facing edge 2c.

As shown in FIGS. 6 and 7, the frame member 4 has the same shape as that of a peripheral part for picture frame to enclose all of the edge portions and corners of the light guide plate 2. The frame member 4 of the present invention is not limited to this shape. That is, the frame member 4 can have any shape, so long as the light-guide-plate stopper 4b, the first space 4s1 and the second space 4s2 can be formed the frame member 4 and it can enclose a portion of the light guide plate 2 and a portion of the light source 3.

Figure 9:
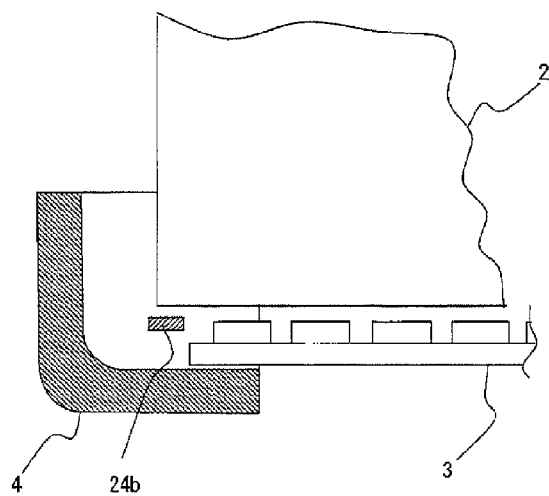
FIG. 9 is a plan view illustrating in detail a further embodiment of a light-guide-plate stopper, according to the present invention.

Here, because the light-guide-plate stopper 4b functions to restrict the light guide plate 2 from moving in the normal line direction (±n) of the light-source facing edge 2c, the shape (particularly, a sectional shape taken in a direction parallel to the front surface 2a and the rear surface 2b of the light guide plate 2) of the light-guide-plate stopper 4b may be changed depending on the position at which the light source 3 is disposed. For example, as shown in FIG. 1, in the case where the light sources 3 are respectively disposed on the two adjacent edges 2c, the sectional shape of the light-guide-plate stopper may be an L shape as designated by reference numeral 4b of FIG. 1 or a shape designated by reference numeral 14b of FIG. 8. As shown in FIG. 9, in the case where the light source 3 is disposed on only one of the adjacent two light-source facing edges 2c, the sectional shape of the light-guide-plate stopper may be an I shape, as designated by reference numeral 24b.

The first space 4s1 is formed in the frame member 4 in such a way that the first space 4s1 extends a predetermined distance along the light-source facing edge 2c from a position adjacent to one corner of the light guide plate 2 in a direction away from the corner. An electric wire (see reference numeral 3c of FIG. 10) which is electrically connected to the light source 3 is arranged through the first space 4s1 and the second space 4s2. In this case, the electric wire 3C is disposed at a rear surface side of the light-guide-plate stopper 4b. Thereby, the electric wire 3C can be prevented from being caught between the light-guide-plate stopper 4b and the light guide plate 2 and being broken. A third space (not shown) which communicates with the second space 4s2 is formed in the frame member 4 and extended along the rear surface 2b of the light guide plate 2. The electric wire 3C is arranged from the second space 4s2 through the third space (refer to FIG. 7). In this way, the electric wire 3C is covered with the frame member 4, thus enhancing the external appearance of the lighting device 1.

Figure 10:
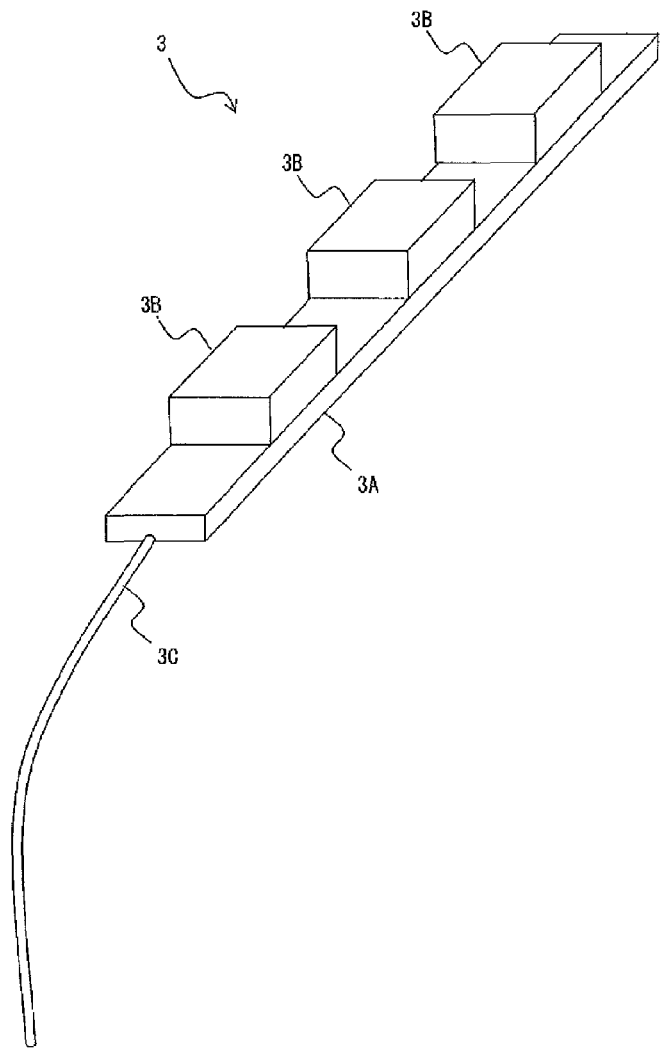
FIG. 10 is a perspective view illustrating an embodiment of the construction of an LED light source, according to the present invention.
Figure 11:
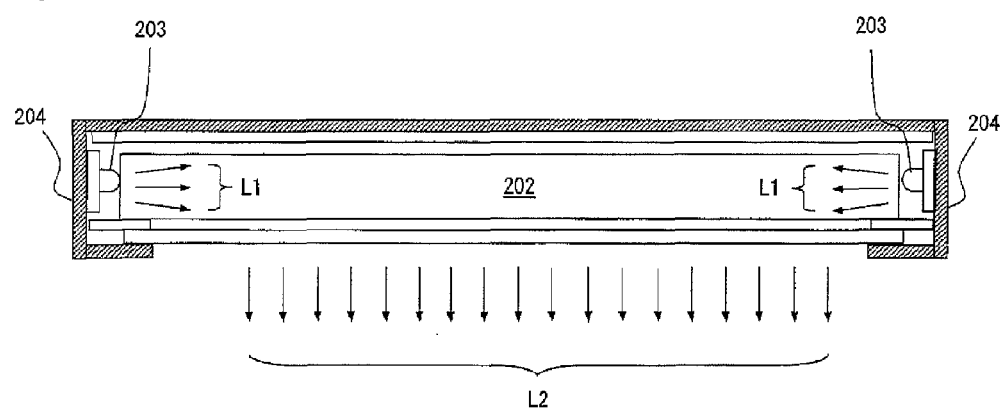
FIG. 11 is a sectional view illustrating an embodiment of a conventional structure of an edge-type lighting device.

Meanwhile, an LED light source is used as the light source 3. As shown in FIG. 10, a plurality of light emitting elements 3B may be connected to a single printed circuit board 3A. In a lighting device which was trial-produced by the inventors of the present invention, about one hundred light emitting elements 3B each of which is 5 mm in length and width were mounted to a printed circuit board 3A with a length of 60 cm.

Figure 4:
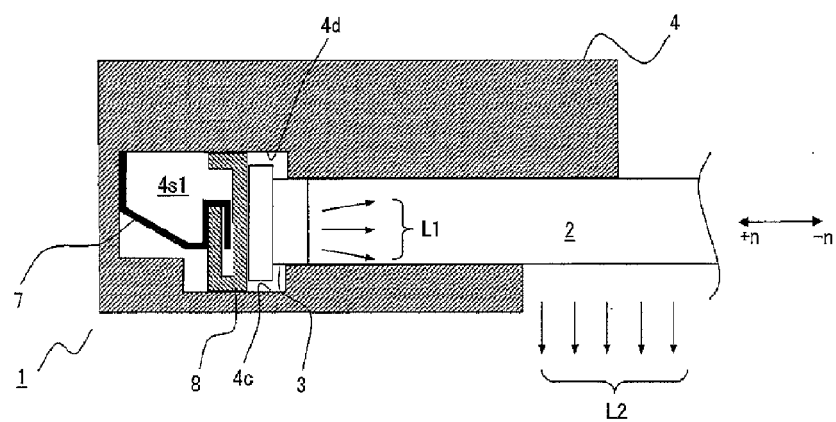
FIG. 4 is a perspective view of the lighting device.

As shown in FIG. 4, a spring 7 which is in a compressed state is disposed in the first space 4s1 behind a rear surface of the light source 3 (that is, at a side opposite to the surface of the light source 3 that faces the light guide plate 2). The spring 7 is configured such that it pushes the light source towards the light-source facing edge 2c. Thus, the light source 3 is brought into close contact with the light-source facing edge 2c, whereby light emitted from the light source 3 can be efficiently guided into the light guide plate so that the light emitting efficiency of the lighting device can be enhanced.

The light-guide-plate stopper 4b is disposed at a position capable of overloading the spring 7. Thereby, the spring 7 can be prevented from being overloaded. Furthermore, the front surface 3a of the light source 3 has an approximate planar shape so that the light source 3 can make contact with the light-source facing edge 2c. In this case, because the light source 3 is brought into surface contact with the light-source facing edge 2c, the light-emitting efficiency of the lighting device can be further enhanced.

Figure 3:
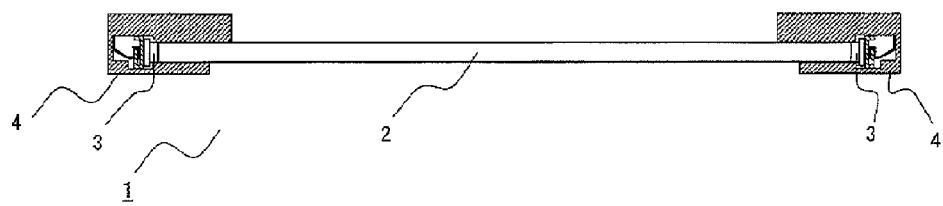
FIG. 3 is a sectional view showing an embodiment of a structure of a lighting device, according to the present invention.

As shown in FIG. 3, the lighting device 1 according to the present invention may be installed under a ceiling. Alternatively, the lighting device 1 may be used in an upright state after it has been rotated by 90° from the state of FIG. 3 (for example, the lighting device may be installed on a sidewall of a room). In this case, although the light guide plate 2 slides downwards because of its own weight, a lower edge of the light guide plate 2 comes into contact with the light-guide-plate stopper 4b so that there is no possibility of the light source 3 being pressed by the lower end of the light guide plate 2. Furthermore, even when the light source 3 is disposed adjacent to an upper edge of the light guide plate 2, because the spring 7 brings the light source 3 into close contact with the upper end of the light guide plate 2, space is prevented from being formed between the light source 3 and the light guide plate 2, whereby the light emitting efficiency can be maintained at a high level.

As shown in detail in FIG. 5, the spring 7 includes a first end 7a which makes contact with the light source 3, a second end 7c which makes contact with the frame member 4, and a part 7b (hereinafter referred to as a "diagonal part"') which is formed between the first and second ends 7a and 7c and comprises a plate spring. The diagonal part 7b is provided to be inclined relative to the light-source facing edge 2c and elastically pushes the light source 3 towards the light guide plate 2. In this case, the length of the spring 7 with respect to the normal line direction (±n) can be reduced compared to those of other kinds of springs, for example, that of a coil spring. Thereby, the size of the frame member 4, in detail, the length of the frame member 4 with respect to the normal line direction (±n), can be reduced, thus improving the appearance of the lighting device.

Furthermore, the first end 7a of the spring 7 may be brought into indirect contact with the light source 3 through a member 8 (hereinafter, referred to as a "slide member"), which is provided so as to be slidable in the normal line direction (±n), rather than being brought into direct contact with the light source 3. For example, a pair of inner surfaces 4c and 4d (two inner surfaces of the frame member 4 that respectively face two side surfaces 3c and 3d of the light source 3) extend approximately parallel to the normal line direction (±n). The slide member 8 has slide surfaces 8a and 8b which respectively make contact with the two inner surfaces 4c and 4d so that the slide member 8 can slide in the normal line direction (±n) while the inner surfaces 4c and 4d respectively come into contact with the slide surfaces 8a and 8b. In this case, the slide member 8 moves parallel to the normal line direction (±n). The spring 7 has a simple structure, as described above, and is able to push the light source 3 in the normal line direction (−n). Even if the light guide plate 2 thermally expands, the LED light source 3 can be prevented from being undesirably tilted, whereby the light-emitting efficiency of the lighting device can be maintained at a high level.

Furthermore, in the construction shown in FIG. 5, although the slide member 8 has been illustrated as being separately provided from the light source 3, the present invention is not limited to this construction. That is, the slide member 8 and the light source 3 may be integrated with each other. In other words, the light emitting element 3B, the printed circuit board 3A and the slide member 8 that is mounted to the printed circuit board 3A may be integrally provided as a single body.

It is preferable that the first end 7a of the spring 7 and the slide member 8 engage with each other such that an inclination angle θ of the diagonal part 7b is maintained approximately constant regardless of the location to which the slide member 8 has moved. In detail, as shown in FIG. 5, the slide member 8 includes a planar part 8c which has a cantilever shape configured in such a way that a first end thereof is supported on the slide member body while a second end thereof protrudes from the slide member body. The first end 7a of the spring 7 has only a shape such that the first end 7a can be fitted over the planar part 8c. In this case, the two components 7 and 8 can be easily connected to each other merely by a simple operation of fitting the first end 7a of the spring 7 over the planar part 8c. Moreover, regardless of the location to which the slide member 8 has moved, the two components 7 and 8 can engage with each other such that the inclination angle θ of the diagonal part 7b can be maintained approximately constant.

In the case where the slide member 8 is separately provided so as to be separable from the light source 3, the slide member 8 and the light source 3 need only to be configured such that they are brought into contact with each other at least three points. In this case, the light source 3, along with the slide member 8, moves parallel to the normal line direction (±n). Therefore, even if the light guide plate 2 thermally expands, the light source 3 can be prevented from being undesirably tilted, thereby maintaining the light-emitting efficiency at a high level.

Meanwhile, the frame member 4 and the slide member 8 are made of a material that has high thermal conductivity (preferably a metal such as aluminum), and the slide member 8 and the light source 3 are configured such that they are brought into surface contact with each other rather than making point contact with each other. In this case, heat of the light source 3 can be efficiently transferred from the slide member 8 to the frame member 4, whereby the heat dissipation effect can be enhanced, thereby increasing the lifetime of the light source 3.

As shown in FIG. 4, although the second end 7c of the spring 7 that is shown in FIG. 5 is illustrated as making direct contact with the frame member 4, the present invention is not limited to this construction. In other words, the second end 7c of the spring 7 may make indirect contact with the frame member 4 through another element.

Furthermore, the spring 7 does not necessarily have to be configured in such a way that the entirety thereof including the first end 7a, the second end 7c and the diagonal part 7b comprises a plate spring. It is sufficient for the diagonal part 7b to comprise a plate spring.

In addition, the slide member 8 and the spring 7 do not necessarily have to be configured such that they continuously extend along the entire length of the frame member 4. For example, slide members 8 and springs 7 may be intermittently arranged at positions spaced apart from each other at intervals of 2 cm.

SEQUENCE LIST TEXT

None

What is claimed is:

1. A lighting device, comprising: a light guide plate made of a transparent material and having a rectangular shape when viewed from a front view; a light source disposed facing at least one of edges of the light guide plate; and a frame member receiving at least a portion of the light guide plate and at least a portion of the light source, the lighting device being configured such that light that is emitted from the light source and enters the light guide plate is emitted from a front surface of the light guide plate, wherein when, among the edges of the light guide plate, an edge that faces the light source is referred to as a (light-source facing edge), the frame member comprises:

a light-guide-plate support part supporting the light guide plate so that the light guide plate can slide in at least a normal line direction of the light-source facing edge;

a first space receiving both an edge portion of the light guide plate that includes the light-source facing edge and the light source disposed facing the light-source facing edge in such a way that the edge portion and the light source can move in the normal line direction;

a light-guide-plate stopper disposed facing a portion of the light-source facing edge that is adjacent to a corner of the light guide plate disposed facing an edge of at least one corner of the light guide plate, the light-guide-plate stopper limiting sliding movement of the light guide plate and spaced apart from the edge of the corner of the light guide plate to the extent of preventing the light-source from being pressed between the light guide plate and the frame member in case of thermal expansion in the normal line direction by heat generated by the light source; and a second space formed at a side of the light-guide-plate stopper that is opposite to a side at which the light guide plate comes into contact with the light-guide-plate stopper, the second space communicating with the first space, and when a portion of the light-guide-plate stopper that is brought into contact with the light-source facing edge when the light-guide-plate stopper limits sliding movement of the light guide plate is referred to as a (stopper side contact portion), and a direction away from the light guide plate based on the stopper side contact portion is referred to as a (light-guide-plate moving away direction), the first space is formed to receive the light source in such a way that the light source is movable in the light-guide-plate moving away direction rather than towards the stopper side contact portion, and an electric wire is connected to the light source and arranged from the first space through the second space.

2. The lighting device of claim 1, wherein the first space extends a predetermined distance along the light-source facing edge from a position adjacent to the corner of the light guide plate in a direction away from the corner.

3. The lighting device of claim 2, wherein the light source comprises an LED light source.

4. The lighting device of claim 2, wherein the frame member has therein a third space communicating with the second space and extending along the rear surface of the light guide plate, and the electric wire is arranged from the second space through the third space.

5. The lighting device of claim 4, wherein the light source comprises an LED light source.

6. The lighting device of claim 2, wherein a spring is provided in the first space and disposed at a side opposite to a surface of the light source that faces the light guide plate, the spring pushing the light source towards the light-source facing edge.

7. The lighting device of claim 6, wherein the light-guide-plate stopper is disposed at a position capable of preventing the spring from being deformed to a predetermined degree or more overloading of the spring.

8. The lighting device of claim 4, wherein a spring is provided in the first space and disposed at a side opposite to a surface of the light source that faces the light guide plate, the spring pushing the light source towards the light-source facing edge.

9. The lighting device of claim 8, wherein the light-guide-plate stopper is disposed at a position capable of preventing the spring from being deformed to a predetermined degree or more overloading of the spring.

10. The lighting device of claim 1, wherein the light source comprises an LED light source.

11. The lighting device of claim 1, wherein a spring is provided in the first space and disposed at a side opposite to a surface of the light source that faces the light guide plate, the spring pushing the light source towards the light-source facing edge.

12. The lighting device of claim 11, wherein the light-guide-plate stopper is disposed at a position capable of preventing the spring from being deformed to a predetermined degree or more overloading of the spring.

* * * * *